(12) United States Patent
Dewey, Jr. et al.

(10) Patent No.: US 7,603,299 B1
(45) Date of Patent: Oct. 13, 2009

(54) AUTOMATED RECEIVING SYSTEM

(75) Inventors: James A. Dewey, Jr., Elgin, SC (US); David L. Carruth, Lake Havasu City, AZ (US); John Andrew Rhodes, Minneapolis, MN (US); Stacey Holland, Andover, MN (US)

(73) Assignee: Target Brands, Inc., Minneapolis, MN (US)

( * ) Notice: Subject to any disclaimer, the term of this patent is extended or adjusted under 35 U.S.C. 154(b) by 1090 days.

(21) Appl. No.: 10/857,178

(22) Filed: May 28, 2004

(51) Int. Cl.
  *G06Q 10/00* (2006.01)
  *G05B 19/418* (2006.01)
  *G05B 13/02* (2006.01)
(52) U.S. Cl. ............... 705/28; 705/8; 700/32
(58) Field of Classification Search ........ 705/28
  See application file for complete search history.

(56) References Cited

U.S. PATENT DOCUMENTS

| | | | | |
|---|---|---|---|---|
| 3,612,305 | A | * | 10/1971 | Wasserman ............ 414/285 |
| 3,908,113 | A | | 9/1975 | Maxham et al. |
| 4,336,589 | A | | 6/1982 | Smith et al. |
| 4,340,810 | A | | 7/1982 | Glass |
| 4,527,937 | A | | 7/1985 | Tomasello, Jr. |
| 4,832,204 | A | | 5/1989 | Handy et al. |
| 5,038,283 | A | | 8/1991 | Caveney |
| 5,362,949 | A | | 11/1994 | Gulick |
| 5,363,310 | A | | 11/1994 | Haj-Ali-Ahmadi et al. |
| 5,395,206 | A | * | 3/1995 | Cerny, Jr. ............ 414/807 |
| 5,550,745 | A | | 8/1996 | Wurz |
| 5,564,879 | A | | 10/1996 | Noguchi |
| 5,568,393 | A | * | 10/1996 | Ando et al. ............ 700/214 |
| 5,595,263 | A | | 1/1997 | Pignataro |
| 5,818,528 | A | * | 10/1998 | Roth et al. ............ 348/364 |
| 5,900,610 | A | | 5/1999 | Kelly, Jr. |
| 5,953,234 | A | | 9/1999 | Singer et al. |
| 6,094,642 | A | | 7/2000 | Stephenson et al. |
| 6,148,291 | A | | 11/2000 | Radican |
| 6,164,537 | A | | 12/2000 | Mariani et al. |
| 6,227,377 | B1 | | 5/2001 | Bonnet |
| 6,321,138 | B1 | | 11/2001 | Livesay et al. |
| 6,332,098 | B2 | | 12/2001 | Ross et al. |
| 6,505,730 | B1 | | 1/2003 | Linder |
| 6,536,659 | B1 | | 3/2003 | Hauser et al. |
| 6,697,812 | B1 | | 2/2004 | Martin |
| 6,704,613 | B2 | | 3/2004 | Gomez |
| 2002/0152140 | A1 | * | 10/2002 | Kondo et al. ............ 705/28 |
| 2003/0093178 | A1 | | 5/2003 | Russell et al. |
| 2003/0220711 | A1 | | 11/2003 | Allen |
| 2004/0193466 | A1 | * | 9/2004 | Kull et al. ............ 705/8 |

OTHER PUBLICATIONS

Maloney, David, "The power behind the pony", Modern Material Handling, v. 56, n 7, p. 30, Jun. 2001.*

* cited by examiner

*Primary Examiner*—Matthew S Gart
*Assistant Examiner*—Scott A Zare
(74) *Attorney, Agent, or Firm*—Griffiths & Seaton PLLC

(57) ABSTRACT

An automated receiving system for a distribution facility having at least one automated receiving door and at least one manual receiving door. The automated receiving system includes a scheduler and a transport system. The scheduler is configured to receive electronic shipment data representative of an incoming shipment of packages, to determine an unload score for the incoming shipment based on the electronic shipment data, and to cause the incoming shipment to be directed to either the at least one automated receiving door or the at least one manual receiving door based on the unload score. The transport system is configured to successively receive each package from the incoming shipment and to transport each package within the distribution facility.

27 Claims, 4 Drawing Sheets

US 7,603,299 B1

AUTOMATED RECEIVING SYSTEM

BACKGROUND OF THE INVENTION

As the retail industry continues to become more competitive, keeping items in stock and timely replenishment of out-of-stock items at retail stores is increasingly important in attracting and maintaining customers. Large retailers typically utilize centralized warehouses, or distribution centers, to supply goods to multiple retail stores. Fast and efficient transfer of incoming goods from vendors to retail stores having inventory needs is necessary for distribution centers to properly maintain the inventories of their associated retail stores.

Shipments of goods are generally hauled by carriers, who typically deliver the goods to the distribution centers by truck. Trucks having relatively homogenous loads, such as trucks carrying a single type of product from a single manufacturer, can generally be unloaded and have their contents verified relatively quickly. However, trucks having mixed loads containing a wide variety of products from multiple manufacturers, such as trucks carrying loads from consolidators or import warehouses, can be difficult and time consuming to unload as each package, or carton, must be individually evaluated by distribution center personnel to identify its contents and determine how it is to be distributed. Such a time consuming receiving process is costly and can result in undesirable delays in delivering goods to retail stores having inventory needs.

SUMMARY OF THE INVENTION

One embodiment of the present invention relates to an automated receiving system for a distribution facility having at least one automated receiving door and at least one manual receiving door. The automated receiving system includes a scheduler and a transport system. The scheduler is configured to receive electronic shipment data representative of an incoming shipment of packages, to determine an unload score for the incoming shipment based on the electronic shipment data, and to cause the incoming shipment to be directed to either the at least one automated receiving door or the at least one manual receiving door based on the unload score. The transport system is configured to successively receive each package of the incoming shipment and to transport each package within the distribution facility. Other features and advantages are also disclosed.

BRIEF DESCRIPTION OF THE DRAWINGS

Embodiments of the invention will be described with respect to the figures, in which like reference numerals denote like elements, and in which.

DETAILED DESCRIPTION

Figure 1:
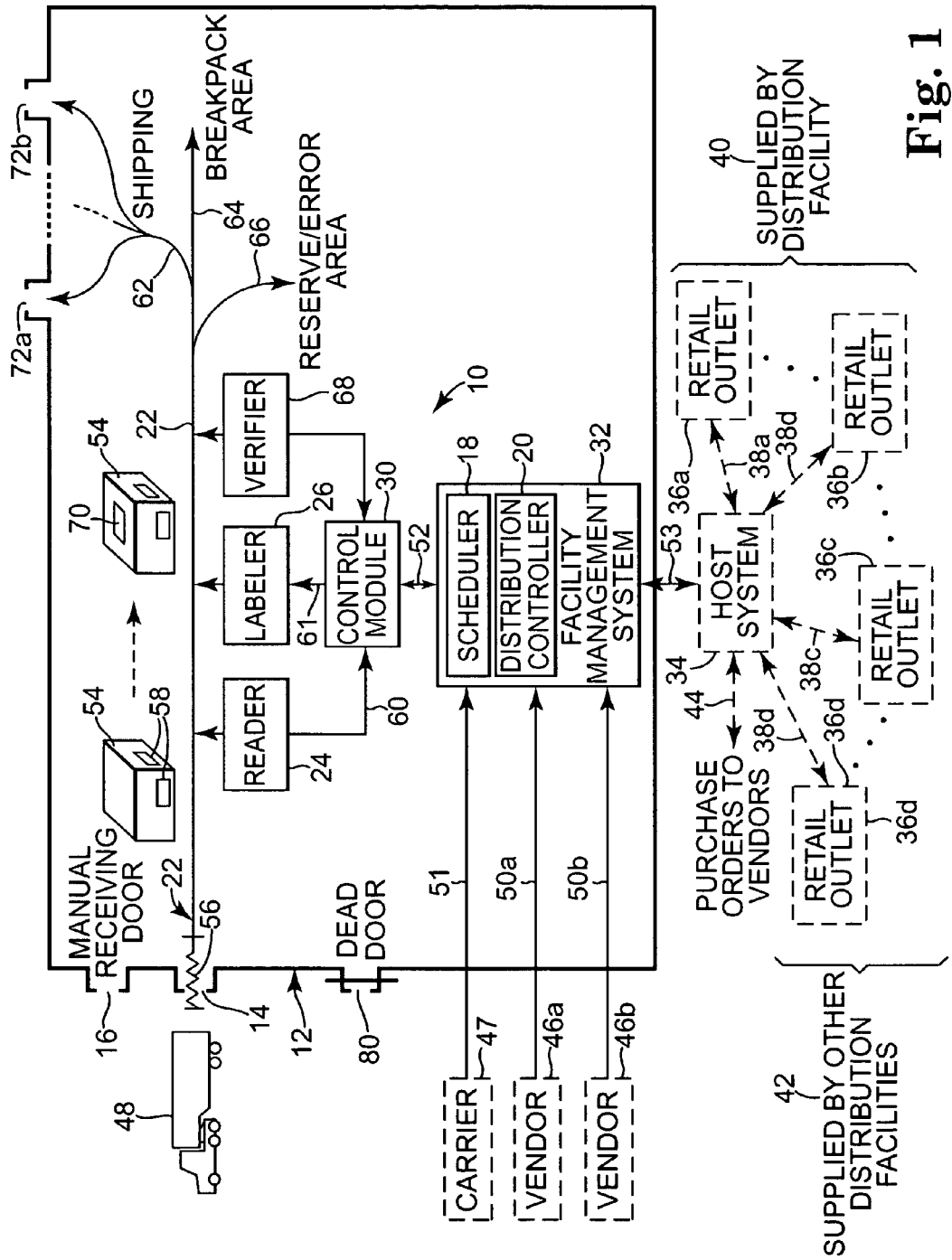
FIG. 1 is block diagram illustrating one embodiment of an automated receiving system according to the present invention.

FIG. 1 is a block diagram generally illustrating one embodiment of an automated receiving system 10 according to the present invention for a distribution facility 12 having at least one automated receiving door 14 and at least one manual receiving door 16. Automated receiving system 10 includes a scheduler 18, a distribution controller 20, a transport system 22, an automated reader 24, a labeler 26, and a control module 30. In one embodiment, as illustrated, scheduler 18 and distribution controller 20 comprise portions of a facility management system 32 configured to monitor, control, and perform substantially all functions associated with the operation of distribution facility 12 including, for example, merchandise tracking, staff planning, and productivity analysis.

An external host system 34 monitors the inventory needs of all retail outlets 36 of an associated retail corporation or other entity via communication links 38, including retail outlets 40 supplied by distribution facility 12 and retail outlets 42 supplied by other distribution facilities (not shown). Based on the inventory needs of retail outlets 36, external host system 34 issues purchase orders (PO's) 44 to various vendors 46, each PO having an associated PO number and each directing the purchase of described product(s) from a vendor which are necessary to maintain the inventories of retail outlets 36, and directing where the ordered products are to be delivered. The term "vendor" as used herein is used to describe any entity which provides goods or other products, such as a manufacturer or importer. A copy of each PO 44 directing the purchase of products for a retail outlet 36 is forwarded to the retail outlet's corresponding distribution facility. As such, a copy of any PO directing the purchase of products for retail outlets 40 supplied by distribution facility 12 is provided to facility management system 32 via a communications link 53.

As directed by PO's 44 associated with retail outlets 40, vendors 46 periodically ship products to distribution facility 12. Generally, vendors 46 do not ship the products themselves, but instead employ one or more carriers, such as carrier 47, to deliver the ordered products to a distribution facility 12. Vendors 46 typically generate a bill of lading (BOL), each having a BOL number and listing the PO numbers associated with the products being shipped via carrier 47.

Carriers 47 generally deliver the products to distribution facility 12 by truck, and sometimes combine multiple BOL's from multiple vendors, such as vendors 46a and 46b, into a single shipment 48. For each shipment, such as shipment 48, carrier 47 generates a separate progressive list (PRO) that indicates the BOL numbers and the PO numbers associated with products contained in shipment 48, and a total quantity of packages associated with each PO. Prior to shipment 48 arriving at distribution facility 12, carrier 47 transmits the PRO list associated with shipment 48 as electronic shipment data to facility management system 32 of distribution facility 12 via a communication link 51. In response to receipt of electronic shipment data from carrier 47, scheduler 18 assigns a shipment identification number to shipment 48.

Additionally, after shipping products via a carrier, such as carrier 47, vendors 46 transmit to facility management system 32 via communications links 50 electronic shipment data representative of the products being shipped via carrier 47 in shipment 48. Typically, the electronic shipment data provided by vendors 46 comprises the BOL number, PO numbers associated with the shipped products, a package identification code associated with each package of each PO, a product identification code associated with the type of product in each package, how many total units of a given product are being shipped, and the number of product units a given product contained in a package. However, the electronic shipment data provided by vendors 46 may sometimes comprise only the PO numbers associated with the products contained in shipment 48.

Prior to arrival of shipment 48 at distribution facility 12, scheduler 18 applies an algorithm to the electronic shipment data received from vendors 46 and carrier 47 to determine an unload score for shipment 48. Based on the unload score, scheduler 18 directs shipment 48 to either automated receiving door 14 or manual receiving door 16. Scheduler 18 determines point values for a plurality of shipment characteristics of shipment 48 and then totals the point values for each of the shipment characteristics to determine the unload score. In one embodiment, the higher the point value for a shipment characteristic, the better the candidate the shipment is for being directed to automated receiving door 14.

An example of one such shipment characteristic comprises the total number of packages in shipment 48. The higher the number of packages, the higher the point value for this characteristic. An example of another shipment characteristic comprises the number of products contained in shipment 48. The higher the number of different products, the higher the point value for this characteristic. An example of another shipment characteristic involves the conveyability of the packages contained in shipment 48. The higher the number of packages that are able to be transported by a conveyor system, the higher the score for this characteristic.

An example of yet another shipment characteristic involves how well the electronic shipment data received from carrier 47 correlates with electronic shipment data provided by vendors 46. As described above, the electronic shipment data received from carrier 47 includes the BOL numbers associated with shipment 48, the PO numbers associated with each BOL number, and the total number of packages associated with each PO number. Also as described above, the electronic shipment data provided by vendors 46 generally includes the PO's associated with the BOL, how many total units of a given product are associated with each PO, and how many units of a given product are contained in a package. By dividing the total number of units by the number of units in a package, the number of packages of a given product associated with a PO can be determined.

By carrying out the above described process for each type of product associated with a PO, the total number of packages associated with the PO, as based on the vendor 46 electronic shipment data, can be calculated. This calculated number of packages for a PO is then compared to the number of packages associated with the PO as provided by the electronic shipment data provided by carrier 47. The above described process is repeated for each PO associated with shipment 48. The higher percentage of PO's having a calculated number of packages matching the number of packages provided by vendor 47 via the electronic shipment data, the higher the point value for this shipment characteristic. It should be noted that in cases where the electronic shipment data provided by vendors 46 comprises only the PO numbers associated with a shipment, such as shipment 48, such a low point value will result for this shipment characteristic that shipment 48 will likely be directed to manual receiving door 16.

After point values for each of the shipment characteristics has been determined, scheduler 18 totals them to determine the unload score for shipment 48. In one embodiment, if the unload score is at or exceeds a threshold unload score, scheduler 18 directs shipment 48 to automated receiving door 14. In one embodiment, scheduler 18 compares the unload score for shipment 48 to unload scores for other shipments scheduled to arrive at distribution facility 12 to determine whether to direct shipment 48 to automated receiving door 14 or manual receiving door 16. If the unload score for shipment 48 is high relative to other shipments, shipment 48 is more likely to be directed to automated receiving door 14. If shipment 48 has an associated unload score that results in shipment 48 being directed to automated receiving door 14, scheduler 18 provides the previously assigned shipment identification number for shipment 48 to control module 30 via a communication link 52.

Facility management system 32 provides the BOL numbers and PO numbers received via the electronic shipment data to external host system 34 via a communication link 53. In one embodiment, communication link 53 comprises an internet link. In response, host system 34, based on the electronic shipment data, determines the composition of shipment 48 including a package identification code associated with each package, the type of product in each package, a number of packages containing each type of product, and a number of units of the product in each package containing the product. Host system 32 compares the above described information determined from the electronic shipment data with the inventory needs of retail outlets 40 supplied by distribution facility 12 to generate distribution instructions for each package of the shipment, indicating where each package is to be transported within distribution facility 12.

After arrival of shipment 48 at automatic receiving door 14, transport system 22 is configured to successively receive packages 54 as they are unloaded by distribution facility personnel from shipment 48 and to transport packages 40 to one of several locations within distribution facility 12. In one embodiment, transport system 22 comprises a conveyor system, including an extendable portion 56 than can be extended into a truck carrying shipment 48 as packages 54 are unloaded.

Automated reader 24 is configured to identify vendor applied labels 58 on packages 54 as they are transported along transport system 22, with each vendor label 58 being one of a plurality of label types and comprising a package identifier code representative of the corresponding package to which label 58 is affixed. Examples of vendor applied label types include standard barcode labels such as the "Code 128" label, the "Interleaved 2 of 5" code (I2O5), the universal product code (UPC), and the "European article number" code (EAN), each of which are familiar to those of ordinary skill in the art. Automated reader system 24 is further configured to provide a label request message for each package 54 to control module 30 via a communication link 60, the label request message including a label type portion and an identifier code portion that are based on the vendor labels 58 identified for each package 54.

In one embodiment, automated reader 24 includes a look-up table of recognizable label types, each recognizable label type having an assigned priority level. If multiple labels are identified, automated reader 24 indexes the label type of each identified label to the look-up table and selects the identified label having the label type with the highest priority level. In this instance, the label type portion and identifier code portion of the label request message correspond respectively with the label type and identifier code of the selected label. If only one label is identified, automated reader 24 indexes the label type of the identified label to the look-up table to ensure that the label type is a recognizable label type. In this instance, if the label type matches one of the recognizable label types, the label type portion and identifier code portion of the label request message correspond respectively with the label type and identifier code of the one identified label. If no labels are identified, or if none of the identified labels matches any of the recognizable label types, the label type portion and identifier code portion of the label request message are assigned values indicating that no labels were identified.

If a recognizable label type was selected by automated reader 24, control module 30 adds additional identifying information to the label request message, such as the appointment number associated with shipment 48, and a time/date stamp, and provides this modified label request message to distribution controller 20 via communication link 52. If the label type and identifier code portions of the label request message received from automated reader 24 indicate that no labels were identified, control module 30 provides a label format message to labeler 26 via a communication link 61 indicating that no recognizable labels were identified, in lieu of providing the label request message to distribution controller 20. Labeler 26 is described in further detail below.

Distribution controller 20 receives the label request message for each package via communication link 52, and compares the associated package identifier code to the electronic shipment data received from vendors 46 and the distribution instructions received from external host system 32 to determine a distribution label message. Based on the comparison, distribution controller 20 provides a distribution label message for each package 54 to control module 30 via communications link 52. In one embodiment, the distribution label message comprises a routing code having a location portion representative of a location within distribution facility 12 to which each package is to be transported. As illustrated, distribution facility 12 includes at least three such locations, indicated as shipping area 62, breakpack area 64, and reserve/error area 66. In one embodiment, the routing code, in addition to the location portion, further includes an outlet portion representative of one of the retail outlets 40 supplied by distribution facility 12.

In one embodiment, if the distribution instructions indicate that the entire quantity of product units of the package are needed by a single retail outlet, such as retail outlet 36a, the location portion of the routing code will be representative of shipping area 62 and the outlet portion of the routing code will be representative of retail outlet 36a. In one embodiment, shipping area 62 includes a plurality of shipping doors 72, with one shipping door corresponding to each retail outlet 36. As such, the outlet portion of the routing code is representative of the shipping door 72 assigned to the corresponding retail outlet 36.

In one embodiment, if the distribution instructions indicate that only a portion of the entire contents are needed by one or more retail outlets 36, the location portion of the routing code will be indicative of breakpack area 64. At breakpack area 62, distribution facility personnel open the package and divide the contents as required to meet the inventory needs of each associated retail outlet 36. In one embodiment, if the distribution instructions indicate that there is not a present need for any of the units of product contained within the package, the location portion of the routing code will be indicative of the reserve/error area 66. In one embodiment, if distribution controller 20 is unable to determine a match between the package identifier code received via the label request message from control module 30 and the distribution instructions received from host system 34, the distribution label message will provide indication that no distribution instruction data was found.

Based on either the distribution label message received from distribution controller 20 or on the label request message received from automated reader 24, control module 30 provides a label format message for each package 54 to labeler 26 via communication link 61. As described above, if the label type and identifier code portions of the label request message received from automated reader 24 indicate that no labels were identified, control module 30 provides a label format message to labeler 26 via a communication link 61 indicating that no labels were found and further causes conveyor system 22 to direct the corresponding package 54 to reserve/error area 66. In response to the label format message, labeler 26 prints and affixes a distribution label 70 to corresponding package 54 having a text message indicating that no label was found.

If the distribution label message received from distribution controller 20 indicates that distribution controller 20 was unable to determine a match between the package's identification number and the distribution instructions, control module 30 provides a label format message to labeler 26 indicating that no data was found and further causes conveyor system 22 to direct the corresponding package 54 to reserve/error area 66. In response to the label format message, labeler 26 prints and affixes a distribution label 70 to corresponding package 54 having a text message indicating that no data was found.

If the distribution label message received from distribution controller 20 includes a routing code, control module 30 provides a label format message to labeler 26 comprising the routing code associated with package 54. In response, labeler 26 prints and affixes a distribution label 70 to package 54 having a routing code portion representative of the routing code corresponding to package 54. In one embodiment, the routing code portion comprises a bar code, such as a "Code 128" bar code and a I2O5 bar code. Conveyor system 22 is then configured to direct package 54 to reserve/error area 66, to breakpack area 64, or to a specific shipping door 72 in shipping area 62 based on the routing code portion of distribution label 70.

In one embodiment, automated receiving system 10 further includes a verifier 68 configured to read distribution label 70 and to provide verification data representative of routing code portion of distribution label 70 to control module 30. Control module 30 compares the verification data to distribution label message corresponding to package 54. If there is a correlation between the verification data and the routing code of the corresponding distribution label message, conveyor system 22 transports package 54 based on the routing code portion of distribution label 70 as described above, and control module 30 provides a verification message to distribution controller 20 indicating that package 54 has been received. If no correlation can be found between the verification data and the routing code of the corresponding distribution label message, control module 30 causes package 54 to be removed from conveyor system 22. In one embodiment, the removed package is returned to conveyor system 22 prior to automated reader 24 such that it is once again "read" by automated reader 24.

By automatically identifying packages as they are unloaded from a shipment and distributing identified packages within the distribution facility based on retail outlet inventory needs, automated receiving system 10 according to the present invention reduces the time required to process shipments. As a result, automated receiving system 10 reduces labor costs and reduces the time required to supply the inventory needs of associated retail outlets. Furthermore, the time-saving benefits of automated receiving system 10 are optimized by evaluating shipment characteristics prior to their arrival so that only those shipments most likely to result in the largest time savings are processed by automated receiving system 10.

Figure 2:
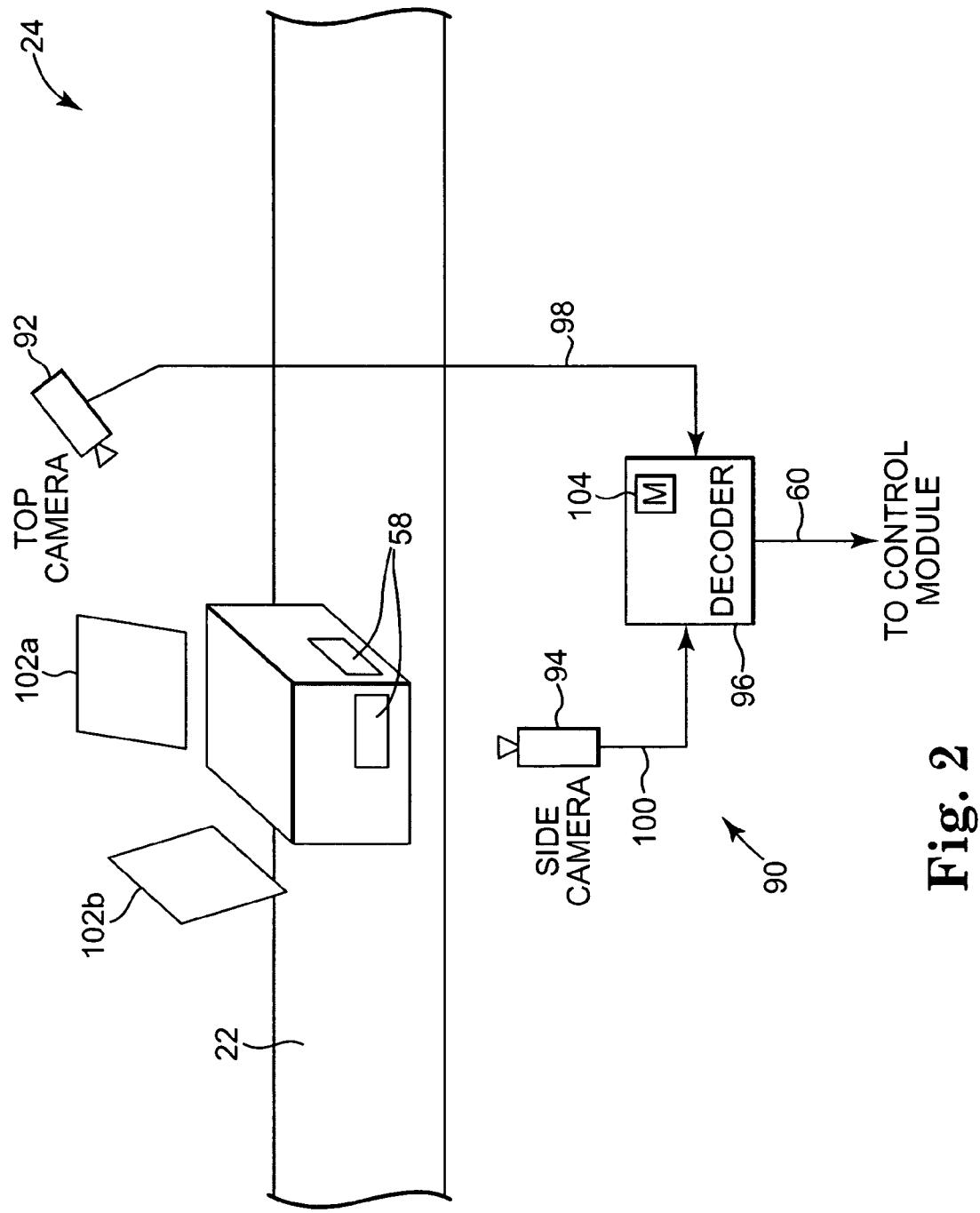
FIG. 2 is a block diagram illustrating one embodiment of an automated reader as employed by the automated receiving systems illustrated by FIG. 1.

FIG. 2 is a block diagram illustrating one embodiment of automated reader system 24 according to the present invention. Automated reader system 24 includes a scanning system 90 comprising a first camera 92 and a second camera 94, and a decoder 96. Cameras 92 and 94 are configured to provide to decoder 96 digital image data representative of at least a portion of the outer surface of package 54, and potentially vendor labels 58, as package 54 moves along conveyor system 22. Camera 92 is generally positioned so as to provide digital image data representative of the top and front of package 54, while camera 94 is generally positioned so as to provide digital image data representative of the side of package 54. In one embodiment, reader system 24 further includes a plurality of mirrors 102 positioned so as to provide reflected images of portions of the outer surfaces of package 54 that would not otherwise be exposed to cameras 92 and 94.

Decoder 96 is configured to identify vendor labels 58 present in the digital image data received from cameras 92 and 94 via communication links 98 and 100. Decoder 96 includes a memory 104 storing the look-up table of recognizable label types and corresponding assigned priority levels as described above with respect to FIG. 1. Also as described above with respect to FIG. 1, decoder 96 references identified vendor labels with the look-up table stored in memory 104 to select an identified vendor label, the label type and package identification code of which will be included as part of the label request message provided to control module 30 via communication link 60. In one embodiment, decoder 96 comprises a specially programmed personal computer.

Figure 3:
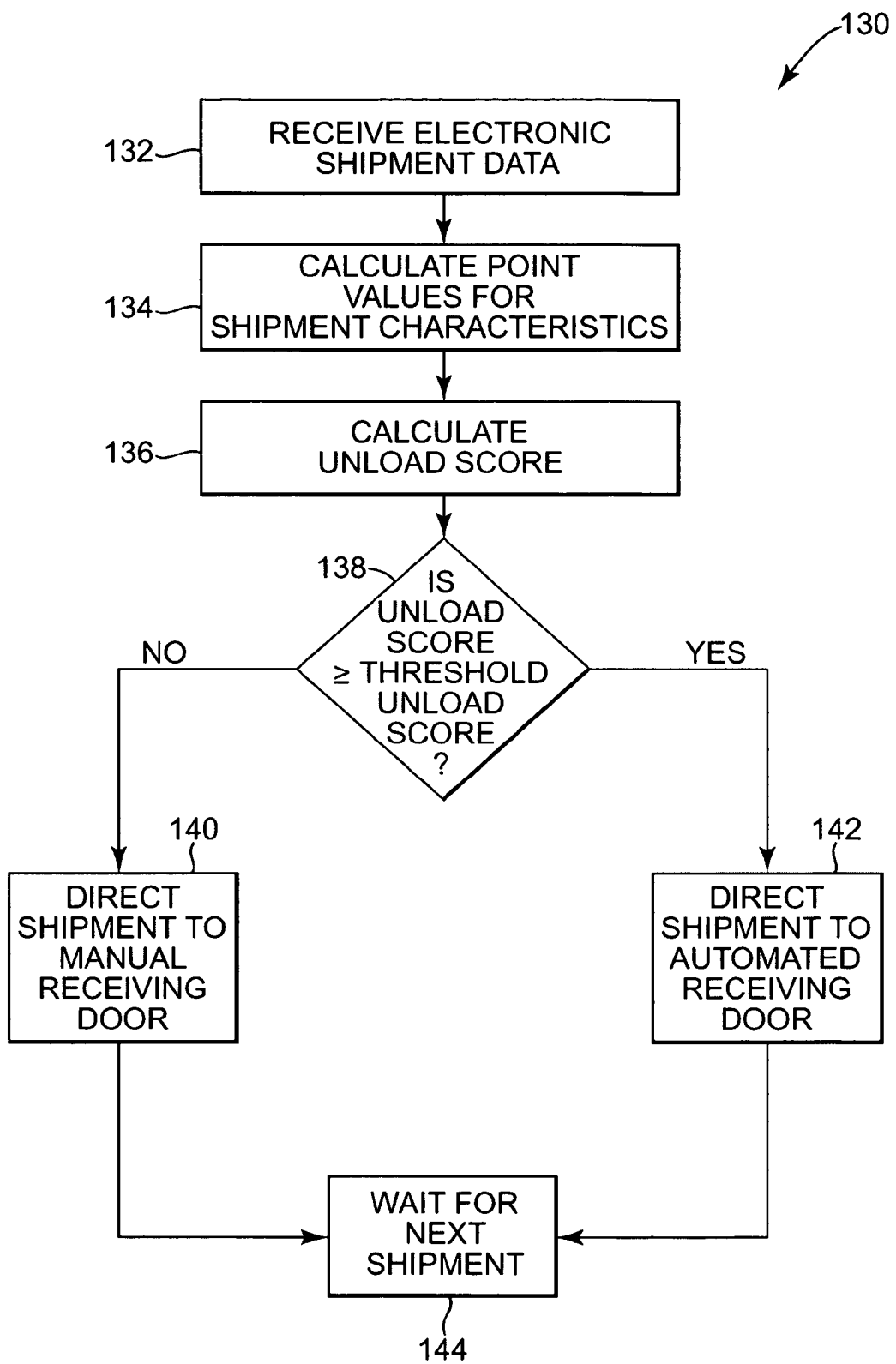
FIG. 3 is a flow diagram illustrating one embodiment of a process according to the present invention for receiving packages from a shipment of packages.

FIG. 3 is a flow diagram illustrating one exemplary embodiment of a process 130 according to the present invention for receiving packages of an incoming shipment of packages to a distribution facility having at least one automated receiving door and at least one manual receiving door. Process 130 begins at step 132 with the receipt of electronic shipment data representative of the incoming shipment of packages. At step 132, in a fashion similar to that described with reference to scheduler 18 of FIG. 1, process 130 determines a point value for each shipment characteristic of a plurality of shipment characteristics of the incoming shipment based on the electronic shipment data. Examples of such shipment characteristics may include, as described above with respect to FIG. 1, a total number of packages included in the incoming shipment and a number of products contained in each package. At step 136, an unload score for the incoming shipment is determined by summing the point values of each shipment characteristic as calculated at step 138. At step 138, process 130 queries whether the unload score for the incoming shipment is greater than or equal to a threshold unload score. If the answer to the query is "no", process 130 proceeds to step 140, where process 130 causes the incoming shipment to be directed to the manual receiving door. If the answer to the step 138 query is "yes", process 130 proceeds to step 142 where process 130 causes the incoming shipment to be directed to the automated receiving door. At the completion of both steps 140 and 142, process 130 proceeds to step 144 where it waits for receipt of electronic shipment data for a next incoming shipment of packages.

Figure 4:
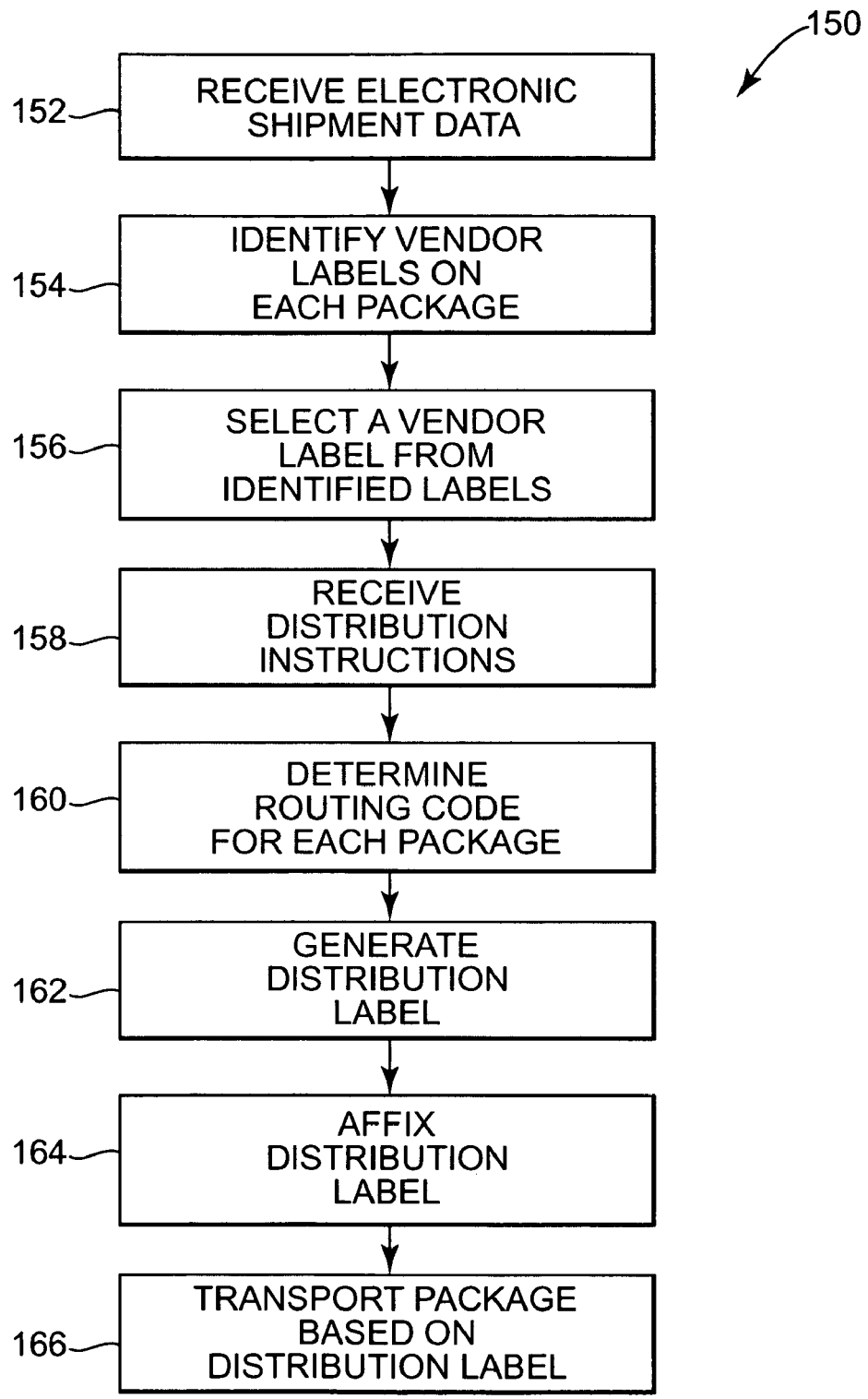
FIG. 4 is a flow diagram illustrating another embodiment of a process according to the present invention for receiving packages from a shipment of packages.

FIG. 4 is a flow diagram illustrating one exemplary embodiment of a process 150 according to the present invention for receiving packages of an incoming shipment of packages to a distribution facility supplying inventory to a plurality of retail outlets. Process 150 begins at step 152 with the receipt of electronic shipment data representative of the incoming shipment of packages. At step 154, process 150 identifies vendor applied labels on each package as it is unloaded from the incoming shipment, with each vendor label being one of a plurality of label types and comprising a package identifier code representative of the corresponding package. At step 156, process 150 selects a vendor label for each package from those vendor labels that have been identified from the package. In one embodiment, as described above with respect to automated reader 24 of FIG. 1, process 150 selects the vendor label by comparing the identified vendor labels to a predetermined plurality of label types, each label type having an assigned priority, and selecting the identified vendor labels with a label type having the highest assigned priority level.

At step 158, process 150 receives distribution instructions for each package of the shipment, wherein the distribution instructions are based on the electronic shipment data and on the inventory needs of the plurality of retail outlets supplied by the distribution facility. Process 150 then proceeds to step 160 where it determines a routing code for each package by comparing the package identifier code of the selected vendor label to the electronic shipment data and the distribution instructions, wherein the routing code is representative of one of a plurality of predetermined locations within the distribution facility.

Process 150 then proceeds to step 162 where a distribution label is generated for each package that is representative of each package's corresponding routing code. At step 164, each distribution label is affixed to the corresponding package. Lastly, at step 166, each package is transported to one of the plurality of predetermined locations within the distribution facility based on the corresponding distribution label.

One aspect of the present invention relates to retrofitting existing distribution facilities with an automated receiving system according to the present invention, wherein the existing distribution facilities each include a plurality of doors classified as receiving doors for receiving shipments of packages. One embodiment of a process for retrofitting such a distribution facility includes reclassifying at least one receiving door as a manual receiving door, reclassifying at least one receiving door as an automated receiving door, and reclassifying those receiving doors not classified as either a manual receiving door or as an automated receiving as dead doors, wherein dead doors are precluded from receiving shipments of packages. The retrofitting process further includes providing an automated receiving system according to the present invention, wherein the automated receiving system is configured to receive shipments of packages via the at least one automated receiving door.

Although the invention has been described with respect to particular embodiments, such embodiments are for illustrative purposes only and should not be considered to limit the invention. Various alternatives and changes will be apparent to those of ordinary skill in the art.

What is claimed is:

1. A method of receiving packages from an incoming shipment of packages to a distribution facility, the method comprising:

providing a scheduler processor at the distribution facility as part of a management system, the distribution facility including at least one automated receiving door and at least one manual receiving door;

receiving, at the management system of the distribution facility, electronic shipment data representative of the incoming shipment of packages, wherein the electronic shipment data is received prior to arrival of the incoming shipment of packages at the distribution facility;

automatically determining with the scheduler processor of the management system an unload score for the incoming shipment of packages based on the electronic shipment data, the electronic shipment data including and the unload score being at least partially based on at least two or more of the following: a total number of packages in the incoming shipment of packages, a number of products in the incoming shipment of packages, and a conveyability of the packages contained in the incoming shipment of packages, wherein the unload score is determined prior to arrival of the incoming shipment of packages at the distribution facility;

automatically comparing the unload score to a threshold unload score using the scheduler processor;

the scheduler processor automatically directing a truck carrying the incoming shipment to the at least one automated receiving door when the unload score is at least equal to the threshold unload score; and the scheduler processor automatically directing a truck carrying the incoming shipment to the at least one manual receiving door when the unload score less than the threshold unload score.

2. The method of claim 1, wherein the step of automatically determining an unload score for the incoming shipment of packages comprises:

determining a point value for each shipment characteristic of a plurality of shipment characteristics of the incoming shipment of packages based on the electronic shipment data; and summing the point values of each shipment characteristic to determine the unload score for the incoming shipment of packages.

3. The method of claim 1, further comprising:

adjusting the threshold unload score based on unload scores of a plurality of other incoming shipments of packages to the distribution facility.

4. An automated receiving system for a distribution facility having at least one automated receiving door and at least one manual receiving door; the automated receiving system comprising:

means for receiving electronic shipment data representative of an incoming shipment of packages, the electronic shipment data including a carrier supplied data portion and a vendor supplied data portion, each of the carrier supplied data portion and the vendor supplied data portion including at least one bill of lading number, at least one purchase order number, and a total number of packages associated with each purchase order number, wherein the electronic shipment data further includes a total number of packages in the incoming shipment of packages, a number of products in the incoming shipment of packages, and a conveyability of packages contained in the incoming shipment of packages, and the electronic shipment data is received prior to arrival of the incoming shipment of packages at the distribution facility;

means for automatically calculating an unload score for the incoming shipment of packages based on the electronic shipment data, wherein the unload score is based on at least three of the following: (1) the total number of packages in the incoming shipment of packages, (2) the number of products in the incoming shipment of packages, (3) the conveyability of packages contained in the incoming shipment of packages, and (4) a determination of how closely the carrier supplied data portion corresponds with the vendor supplied data portion; and means for automatically directing the incoming shipment of packages to either the at least one automated receiving door or the at least one manual receiving door based on the unload score including means for comparing the unload score to a threshold unload score, such that the means for directing directs the incoming shipment of packages to the at least one automated receiving door when the unload score is at least equal to the threshold unload score.

5. The automated receiving system of claim 4, further comprising:

means for calculating an unload score for each incoming shipment of packages of a plurality of incoming shipments of packages; and means for dynamically adjusting the threshold unload score based on the unload score of each of the plurality of incoming shipments of packages.

6. The automated receiving system of claim 4 further comprising:

means for calculating a point value for each shipment characteristic of a plurality of shipment characteristics of the incoming shipment of packages, wherein the unload score comprises a sum of the point values of each of the shipment characteristics.

7. The method of claim 1 further comprising:

identifying automatically vendor applied labels on each package of the incoming shipment of packages using at least one scanner, each such vendor applied label being one of a plurality of label types and comprising a package identifier code representative of a corresponding one of the packages;

selecting one of the vendor applied labels for each package from identified vendor applied labels from the packages based on label type;

receiving distribution instructions for each package, the distribution instructions being based on the electronic shipment data and on inventory needs of a plurality of retail outlets;

determining a routing code for each package based on a comparison for each package of the package identifier code of the selected one of the vendor applied labels with the electronic shipment data and the distribution instructions, the routing code being representative of one of a plurality locations within the distribution facility.

8. The method of claim 7, further comprising:

generating a distribution label for each package representative of the routing code corresponding to each package; and affixing the distribution label to the corresponding one of the packages.

9. The method of claim 8, further comprising:

transporting each package to one location of the plurality of locations within the distribution facility based on the distribution label.

10. The method of claim 7, wherein the step of selecting one vendor applied label for each package comprises:

comparing the label type of each identified vendor applied label to a predetermined plurality of label types, each label type of the plurality of label types having an assigned priority level; and selecting the identified vendor applied label with a label type of the plurality of label types with a highest assigned priority level as compared to other ones of the assigned priority levels of the plurality of label types.

11. The method of claim 1, wherein:

receiving electronic shipment data includes receiving a carrier data portion and a vendor data portion, the carrier data portion and the vendor data portion each including at least one bill of lading number, at least one purchase order number, and a total number of packages associated with each purchase order number; and automatically determining the unload score includes comparing the carrier data portion to the vendor data portion and calculating the unload score to be indicative of how closely the carrier data portion corresponds with the vendor data portion;

wherein when the unload score is at least equal to the threshold unload score, the unload score indicates a relatively high level of correspondence between the carrier data portion and the vendor data portion.

12. The automated receiving system of claim 4, wherein the means for automatically calculating is configured to calculate the unload score prior to arrival of the incoming shipment of packages at the distribution facility.

13. The automated receiving system of claim 4, wherein when the unload score is at least equal to the threshold unload score, the unload score is indicative of a relatively high level of correspondence between the carrier supplied data portion and the vendor supplied data portion.

14. A method for use at a distribution facility, the method comprising:

receiving electronic shipment data via a scheduler processor located at the distribution facility prior to arrival of an incoming shipment of packages at the distribution facility, the electronic shipment data being representative of the incoming shipment of packages and including a carrier data portion and a vendor data portion for the incoming shipment each received by the scheduler processor via a communication link, wherein the carrier data portion and the vendor data portion each include at least one bill of lading number, at least one purchase order number, and a total number of packages associated with each purchase order number, and wherein the distribution facility includes at least one automated receiving door and at least one manual receiving door;

using the scheduler processor to automatically determine an unload score for the incoming shipment of packages based on the electronic shipment data prior to arrival of the incoming shipment of packages at the distribution facility, wherein using the scheduler processor to automatically determine the unload score includes automatically comparing the carrier data portion to the vendor data portion to at least partially determine the unload score based on how closely the carrier data portion corresponds with the vendor data portion of the electronic shipment data;

automatically determining, using the scheduler processor, whether to direct the incoming shipment of packages to the at least one automated receiving door or the at least one manual receiving door including:

using the scheduler processor to automatically cause the incoming shipment of packages to be directed to the at least one automated receiving door when the unload score indicates a high level of correspondence between the carrier data portion and the vendor data portion, wherein the unload score indicates a high level of correspondence between the carrier data portion and the vendor data portion when the unload score is at least equal to a threshold score, and using the scheduler processor to automatically cause the incoming shipment of packages to be directed to the at least one manual receiving door based on the unload score when the unload score indicates a low level of correspondence between the carrier data portion and the vendor data portion; and using a transport system to successively receive each package of the incoming shipment of packages and to transport each package within the distribution facility from the at least one automated receiving door.

15. The method of claim 14, further comprising:

dynamically adjusting the threshold score based on unload scores determined for a plurality of other incoming shipments of packages to the distribution facility.

16. The method of claim 14, wherein using the scheduler processor to automatically determine the unload score includes:

determining a point value for each shipment characteristic of a plurality of shipment characteristics of the incoming shipment of packages; and summing the point values of the plurality of shipment characteristics to determine the unload score.

17. The method of claim 16, wherein determining the point value includes adjusting each point value based on an assigned weight value of a corresponding shipment characteristic.

18. The method of claim 16, wherein one shipment characteristic of the plurality of shipment characteristics has a point value based on a total number of packages in the incoming shipment.

19. The method of claim 16, wherein one shipment characteristic of the plurality of shipment characteristics has a point value based on a number of items contained in each package of the incoming shipment of packages.

20. The method of claim 14, further comprising:

using the scheduler processor to compare the unload score for the incoming shipment of packages to an unload score of each incoming shipment of a plurality of other incoming shipments of packages; and determining whether to direct the incoming shipment to either the at least one automated receiving door or the at least one manual receiving door based in part of the unload score for each incoming shipment of the plurality of other incoming shipments of packages.

21. The method of claim 14, further comprising:

using a reader to automatically detect and identify vendor labels on each package of the incoming shipment of packages, each such vendor label being one of a plurality of predetermined label types and comprising a package identifier code representative of a corresponding package, and to select a vendor label for each package from the identified vendor labels from each package based on label type;

using a controller to receive distribution instructions for each package based on the electronic shipment data and on inventory needs of retail outlets, the controller being coupled to the reader via at least one communication link; and using the controller to assign a routing code for each package based on a comparison of the package identifier code of a corresponding selected vendor label with the electronic shipment data and the distribution instructions;

distributing each package along a conveyor system within the distribution facility based on a corresponding routing code, wherein the conveyor system is part of the transport system within the distribution facility.

22. The method of claim 21, further comprising:
   using a labeler to print and affix to each package a distribution label representative of the routing code corresponding to the package; and
   using the transport system to transport the packages of the incoming shipment of packages to one of a plurality of locations within the distribution facility based on the distribution labels.

23. The method of claim 21, wherein using the reader to select the vendor label comprises:
   comparing label types of identified vendor labels to the plurality of predetermined label types, each of the plurality of predetermined label types having an assigned priority level; and
   selecting the identified vendor label having the label type with the highest assigned priority level.

24. The method of claim 21, wherein the vendor labels are affixed to corresponding outer surfaces of the packages, and wherein the reader comprises a scanning system and a decoder, the method further comprising:
   using the scanning system to provide at least one digital representation of at least a high portion of the corresponding outer surface of each package; and
   using the decoder to identify vendor labels from the at least one digital representation and to compare label types of identified vendor labels to the plurality of predetermined label types, each of the predetermined label types having an assigned priority level, and to select the identified vendor label having the label type with the highest assigned priority level.

25. The method of claim 24, wherein the scanning system comprises at least one camera and wherein the at least one digital representation comprises digital image data.

26. The method of claim 24, wherein the decoder includes a memory, and the method further comprises:
   storing the plurality of predetermined label types and corresponding assigned priority levels to the memory.

27. The method of claim 24, further comprising:
   providing, using the decoder, a label message indicating that one of the packages does not have a corresponding vendor label when either no vendor labels are identified from the at least one digital representation or when no identified vendor labels have label types matching any of the plurality of predetermined label types.

* * * * *

UNITED STATES PATENT AND TRADEMARK OFFICE
CERTIFICATE OF CORRECTION

PATENT NO. : 7,603,299 B1  Page 1 of 1
APPLICATION NO. : 10/857178
DATED : October 13, 2009
INVENTOR(S) : Dewey, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1518 days.

Signed and Sealed this

Fifth Day of October, 2010

David J. Kappos
*Director of the United States Patent and Trademark Office*